United States Patent [19]
Ruthenberg

[11] Patent Number: 5,475,866
[45] Date of Patent: Dec. 12, 1995

[54] SYSTEM FOR INFORMING SECONDARY USERS OF WHICH RADIO CHANNELS ARE USABLE IN WHICH GEOGRAPHIC REGION

[75] Inventor: Ross E. Ruthenberg, WoodDale, Ill.

[73] Assignee: Motorola Inc., Schaumburg, Ill.

[21] Appl. No.: 410,650

[22] Filed: Mar. 24, 1995

Related U.S. Application Data

[63] Continuation of Ser. No. 750,689, Aug. 27, 1991, abandoned.

[51] Int. Cl.⁶ .............................. H04B 7/26; H04Q 7/20
[52] U.S. Cl. ..................... 455/33.1; 455/34.1; 455/56.1; 455/62; 455/63; 379/59
[58] Field of Search ................... 455/33.1–33.4, 455/34.1, 34.2, 54.1, 54.2, 56.1, 62, 63, 67.1; 379/59, 63, 62

[56] References Cited

U.S. PATENT DOCUMENTS

| | | | |
|---|---|---|---|
| 4,790,000 | 12/1988 | Kinoshita | 379/59 |
| 5,020,130 | 5/1991 | Grube et al. | 455/9 |
| 5,193,101 | 3/1993 | McDonald et al. | 455/33.1 |
| 5,276,908 | 1/1994 | Koohgoli et al. | 455/34.1 |

Primary Examiner—Chi H. Pham
Attorney, Agent, or Firm—Donald Kordich; Raymond J. Warren

[57] ABSTRACT

Radio frequency reuse between two or more radio frequency communications systems is facilitated by having a beacon transmitter broadcast information globally throughout an area, which information identifies to users of a second system, which radio frequency resources are already in use by a first communications system. The global broadcast of information as to what channels are in use, permits users in the second system to avoid interfering use of those frequencies.

5 Claims, 1 Drawing Sheet

EXEMPLARY RADIO FREQUENCY SPECTRUM ALLOCATED FOR COMMERCIAL USE

POINT-TO-POINT MICROWAVE SPECTRUM – COMMERCIAL USE 5,475,866

1

SYSTEM FOR INFORMING SECONDARY USERS OF WHICH RADIO CHANNELS ARE USABLE IN WHICH GEOGRAPHIC REGION

This is a continuation of application Ser. No. 07/750,689, filed Aug. 27, 1991 and now abandoned.

FIELD OF THE INVENTION

This invention relates in general to communications systems and methods. In particular, this invention relates to systems and methods by which radio frequency spectrum can be shared between different types of communications systems and their users.

BACKGROUND OF THE INVENTION

It is well known in the communications art that usable radio frequency spectra is becoming increasingly more scarce, particularly as the number of users of radio frequency based communication systems increases. When considering the various types of existing users of radio frequency spectra, which types include commercial broadcast, state, local, and federal governmental agency uses, cellular telephone uses, experimental, telephonic, and even trunked radio systems, it can be seen that available radio frequency spectrum is becoming increasingly more scarce.

Even though available spectrum of radio frequencies is limited, the need for radio frequency spectrum continues to increase as both the number of users of such spectrum increases and the types of uses of such spectrum increases as well. In many regions of United States, for example, the radio frequency spectrum set aside for so-called cellular telephone users has already been saturated such that cellular subscribers must frequently wait for a usable cellular radio frequency channel to become available. As the number of cellular subscribers continues to increase, users will experience increasingly longer delays in obtaining a usable frequency channel.

In addition to the well known cellular telephone service, there are currently in existence, plans for new two-way communications services that will themselves require additional radio frequency spectrum. As communications services increase, they will further crowd the air waves.

Accordingly, there exists a need to be able to more efficiently use the radio frequency spectrum that is currently available. Sharing existing radio frequencies between users, and between types of users, is perhaps the only way to accommodate the expected demand for radio frequencies. A problem with sharing radio frequencies is the interference one user who shares the same frequency with another user, causes to the other user or users. Accordingly, frequency sharing schemes that limit interference to users that share frequencies have been developed, some of which are quite complicated and require a significant amount of computer overhead. (Well known cellular and trunked radio systems both use computers to allocate frequencies between potentially competing users.)

At least one band of radio frequencies that are currently in use in the United States is set aside for use by so-called microwave point-to-point communication systems. This band of frequencies, exist generally between 1.8 and 2.0 GHz, and, by virtue of its high frequency, is usable only over relatively short distances and on a virtual line of sight communications path. Other bands of frequencies include at least the frequencies between 4 and 6 GHz. as well.

2

This frequency band, as well as other frequency bands, is currently in use by governmentally licensed subscribers that in any one area, at any one time, typically use only a very limited portion of the entire band and as such, much of the radio frequency spectrum in the band assigned to these types of users might be reused by other, unrelated services. Since existing users are entitled to a relatively uninterrupted use of this radio frequency spectrum (by virtue of the grant of the licenses of these users from various governmental agencies) any new users on this band of radio frequency spectra will likely be permitted to share such frequencies only if they can do so without adversely affecting existing users. Should new users decide to share these radio frequencies, they must be able do so in a way that permits them to use such frequencies but in a way that does not interfere with pre-existing users. Accordingly, a method and an apparatus that permits sharing of radio frequency spectrum between users of one type of communication system, with users of a second type of radio communication system might permit the limited radio frequency spectrum to be more efficiently used. Such a method and apparatus might dramatically increase the number of uses and users that could be accommodated in the limited radio frequency spectrum.

SUMMARY OF THE INVENTION

There is provided a radio frequency communications system and method for sharing radio frequency spectrum between users of multiple types of services. This system and method limits interference to one type of user of radio frequency spectrum associated with a first type of system that can be caused by simultaneous use of the same radio frequency spectrum by another user associated with another or second system by broadcasting information to users in the second system that these second users need to avoid interfering with the first users of the radio frequency spectrum.

This system and method uses a radio frequency beacon transmitter located near the transmitters of pre-existing users to broadcast information on a radio frequency channel that users in a second or third or other system can monitor to identify the locations and the geographic areas and the frequencies that are in use by an existing system. The broadcast information permits users associated with a system that shares spectrum to know which frequencies are already in use within an area such that interfering re-use of such frequencies within such areas is avoided.

DESCRIPTION OF A PREFERRED EMBODIMENTS

Figure 1:
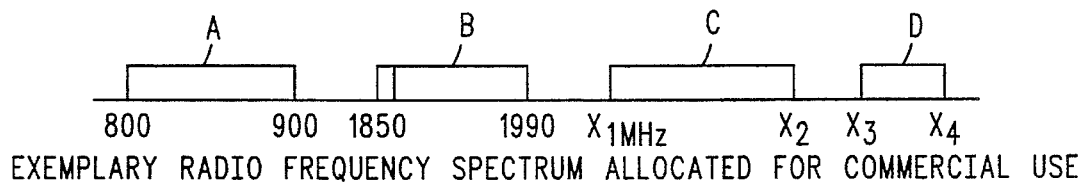
FIG. 1 shows an example of how existing radio frequency spectrum might be allocated in various bands.

FIG. 1 shows an exemplary diagram of how portions of the radio frequency spectrum (above 800 MHz. in this figure) might be allocated for various communications uses. The relative frequencies of four arbitrary bands are shown with respect to each other. Band A is shown between 800 and 900 MHz.; band B is shown between 850 MHz and 1990 MHz.; band C is shown between $X_1$ MHz and $X_2$; band D is shown as between $X_3$ and $X_4$ MHz.

In reality, the radio frequency spectrum shown in FIG. 1 might not be actually allocated as it is shown in FIG. 1, and as such, FIG. 1 is intended to show only that radio frequency spectrum available for communications use is not continuous and that there are blocks, or ranges of spectrum available, such as the spectrum available between 1850 MHz 1900 MHz., which today is largely used by private, point-to-point microwave communications users such as utility companies, state and local governmental agencies, etc. FIG. 1 also shows that each of these bands can be separated from each other by frequency ranges that might be allocated to other uses. It should be obvious that any of the bands shown in FIG. 1 encompass a relatively large portion of the radio frequency spectrum and that most communications applications would require only a small portion of any band. Most frequency bands are therefore subdivided into channels, which channels themselves are frequency bands, to which a user is usually assigned the use thereof under the terms of its license from the Federal Communications Commission (in the United States).

Figure 2:
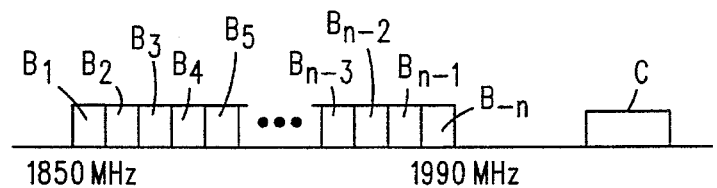
FIG. 2 shows how one band of radio frequencies shown in FIG. 1 might be subdivided to accommodate multiple users using a band of radio frequencies.

FIG. 2 shows an exemplary division of the B band shown in FIG. 1. The frequency bands shown in FIG. 2 in the B band are divided up into a plurality of radio frequency channels designated $B_1$, $B_2$, $B_3$, etc. These radio frequency bands, $B_1$, $B_2$, $B_3$, etc. are typically divided into transmit and receive frequency pairs where each of these bands $B_1$, $B_2$, $B_3$, etc. in reality is a transmit frequency band and a receive frequency band (Transmit and receive designations are arbitrary. One transmitter will ordinarily transmit on its transmit frequency, i.e. the transmit channel, to which a receiver will listen to, i.e. the receive channel. Stated alternatively, each band shown in FIG. 2 is actually a pair of radio frequency channels.)

In the United States, the radio frequency spectrum generally between 1850 MHz and 1990 MHz is primarily allocated to point-to-point microwave communications uses. These point-to-point microwave communications users generally use transmit and receive pairs to provide full duplex communications between radio frequency stations that are communicating with each other.

In any given geographic area of the United States, any one or more of the channels $B_1$, $B_2$, $B_3$, etc. might be allocated to a point-to-point microwave communication system user. Such a user will in general have at least two stations that are communicating with each other, typically using one or more frequencies, such as one or more of the bands (a transmit and receive frequency pair) shown in FIG. 2.

In any geographic area in the United States wherein one or more bands, such as the bands shown in FIG. 2, are not already allocated for use by a user, such an unused radio frequency band might be reused by users associated with another communication system. Re-using unallocated bands in a radio frequency spectrum can create interference between users and is preferably used only where users of the second system know, in advance, of the existence of a prior user on a frequency.

In a point-to-point communication system, the radio frequency signals between stations are frequently performed using highly directional antennas. As such, the geographic area in which a communications band (shown in FIG. 2) is unusable by other radio frequency communications services (by virtue of radiated signals emitted from and received by the point-to-point users) is relatively well defined. Users associated with a second or other communication system outside of the area in which a pre-existing user from a first, point-to-point system is in use, may be able to reuse the same frequency if the users from the second system know the geographic areas in which particular frequencies are already in use. Users associated with a second system could then refrain from using frequencies in areas where such simultaneous use would interfere with the prior users.

Reuse of radio frequency spectrum by second users associated with a second communications system is accommodated in the preferred embodiment by means of at least one beacon transmitter, which is preferably located proximate to the location of a transmitter of the first type of communications system (a point-to-point microwave station in the preferred embodiment) wherein the beacon transmitter broadcasts information to identify to second radio stations associated with a second system, the approximate boundaries of a region in which channels used by the first system are not available for reuse by the second system.

Figure 3:
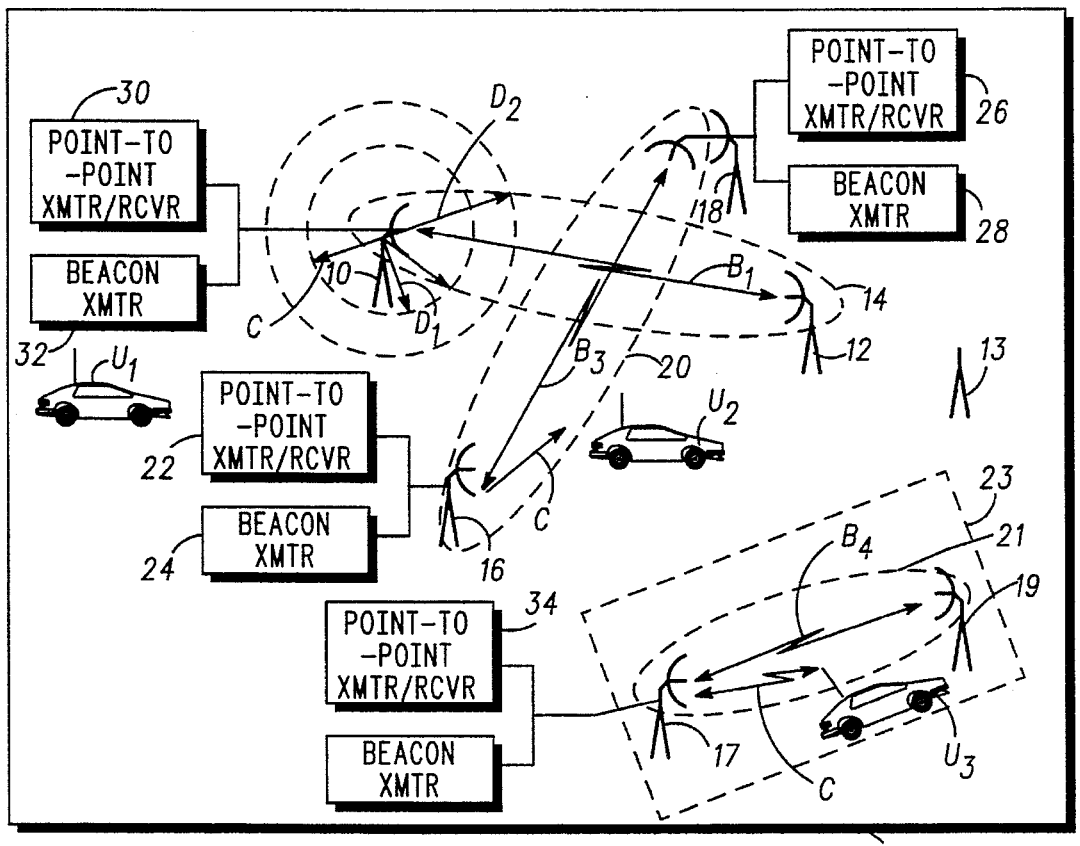
FIG. 3 is a schematic diagram of a geographic area in which users associated with two different radio communication systems share, on a non-interfering basis, radio frequency channels shown in FIG. 2.

Referring to FIG. 3 there is depicted a geographic area A in which a plurality of point-to-point microwave stations communicating with each other use a plurality of bands of frequencies shown in FIG. 2. Within this area A there are shown a plurality of users associated with a second type of radio communication system that share radio frequency bands shown in FIG. 2 on a substantially noninterfering basis with the existing users that use the same bands of frequencies shown in FIG. 2.

Referring to FIG. 3, there is shown a geographic area, A, in which a point-to-point microwave communications station (10) communicates with a second point-to-point communications station (12) using a radio frequency band $B_1$ shown in FIG. 2. This first pair of radio frequency stations (10, 12) and their use of band $B_1$ precludes reuse of the radio frequency band $B_1$ in a geographic area defined within the broken line identified by reference numeral 14. The actual shape and area of the area identified by reference number 14 will depend in part on various factors including for example, the output power of the transmitters at the respective locations, the height of the antennas, the azimuth or direction of the antennas, the directional selectivity of the antennas, the surface features of the area between the two stations, and the sensitivity of the receivers at the respective stations. For purposes of this discussion, the area bounded by the broken line identified by reference numeral 14 is the area in which virtually any use of band $B_1$ by other users could interfere with the use of $B_1$ by the point-to point users at stations 10 and 12. (The actual area in which a new user will interfere with use by a first user will of course vary with many factors including for example the output power of the new user's transmitter and the sensitivity of the first user's receiver.)

Still referring to FIG. 3, a third point-to-point radio communications station (16) communicates with a fourth point-to-point station (18) on radio frequency band $B_3$ which band, $B_3$, is unusable by other any users throughout a second geographic area circumscribed by the broken line identified by reference numeral (20). (As set forth above, the actual area in which a new user will interfere with use by a first user will of course vary with many factors including for example the output power of the new user's transmitter and the sensitivity of the first user's receiver but for purposes of this illustration, these factors are ignored herein.) A fifth point-to-point communications station (17), communicates with a sixth point-to-point communications station (19) on radio frequency band $B_4$ that is unusable by other users within the geographic area circumscribed by the broken line identified by reference numeral (21).

At the station identified by reference numeral 16, a point-to-point transmitter/receiver combination (22) exchanges information with a point-to-point microwave transmitter/receiver pair (26) at the second station (18). It is well established in the microwave communications art that the antennas, output power levels of the transmitters and the physical separation between the stations will all be selected to insure that communications between the stations is not interrupted, despite any signal fading that may occur due to atmospheric changes etc. Despite these precautions, depending upon its antenna height, direction, and transmit power, it is possible that a user of a second type of communications system operating on channels $B_1$ or $B_3$ might emit sufficient energy to interfere with a receiver at either station 10, 18, 12, or 16. (If a new user is in the area bounded by the intersection of the areas identified by reference numerals 14 and 20, such a new user might interfere with either point-to-point station.) In order to ensure that a radio station associated with a second type of radio communications system does not interfere with the use of the band $B_3$ (or $B_1$ for that matter) by these first and second stations (16 and 18), a beacon transmitter (24) which is located proximate to the tower associated with the first of these stations (16), broadcasts pre-determined information on a control or information channel (shown arbitrarily as channel C in FIG. 2) that identifies the area in which channels should not be re-used.

In FIG. 3 there are shown at least three different subscribers (U1, U2, and U3) which might be associated with a second type of communication system, which system might be a personal communications system for example. These new users might also be cellular telephone users in a cellular system sharing the resources depicted in FIG. 2.

In the preferred embodiment of the invention, in order to avoid interfering with the use of the bands used by the point-to-point stations ( 10, 12, 16, 18, and 17, 19), the users associated with the second system (U1, U2, and U3) are informed by beacon transmitters located at each of the point-to-point stations ( 10, 12, 16, 18, 17, and 19) of the frequency and the geographic area over which channels ($B_1$, $B_3$, and $B_4$) are used by the point to point stations (16 and 18). Each beacon transmitter broadcasts information on the geographic area over which frequencies used by the corresponding point-to-point station is using. In addition to broadcasting the particular frequencies, broadcasted information might include, the output signal level from the stations, the antenna height and direction, the geographic boundaries or coordinates of the areas in which new users are prohibited or discouraged (in latitude and longitude for example).

In an alternate embodiment of the invention, a single beacon transmitter (24 for example) might broadcast the information that identifies the location (by latitude and longitude coordinates for example) of all the other stations, the frequencies used by each, the carrier or output power level of each, the azimuth or the direction in which they are all broadcasting, the broadcast signal strength of the beacon transmitter, and also possibly the geographic coordinates of the areas considered by each of the stations to be off-limits to new users.

A user associated with a second type of communication system, depicted in FIG. 3 as user U2, when within range of the signal broadcast from the beacon transmitter (24), if it has the capability of detecting and demodulating and identifying the information broadcast from the beacon transmitter, could adjust its own transmitter and receiver to completely lock out its use of any band used by a point-to-point station it might interfere with. ($B_3$ is the band used by the first and second stations 16 and 18.) If the user U2 has the ability to determine its location (either Loran, dead reckoning or GPS for example) the user U2 might be able to selectively lock out from re-use only those frequencies used in or near the area in which the user U2 is located.

If for example the beacon signal strength and direction is adjusted to cover an area in which re-use of band $B_3$ by a second user, U2, would interfere with the prior use of $B_3$ by the point-to-point stations 16 and 18, the second user, U2 for example, that cannot detect the beacon signal could reasonably assume that since no beacon signal were detected, that any of the channels $B_1$–$B_n$ are available for re-use. Adjusting the signal strength and/or direction of the beacon signal could be used to expand or contract the area in which re-use of a frequency, $B_3$ in this example, is prohibited.

In FIG. 3, the first and second point-to-point stations (10 and 12) are shown communicating with each other using band $B_1$. Like the third and fourth point-to-point stations, (16 and 18), these first and second stations (10 and 12) each have a point-to-point transmitter/receiver (30) at the first station (10) and a point-to-point transmitter/receiver at the second station (12) (which point-to-point transmitter/receiver pair at the second station (12) is not shown for clarity).

As an alternate embodiment of the invention and as a way of enhancing the reuse of radio frequency spectrum, the beacon transmitter (32) coupled to the first point-to-point station location (10) includes the capability of adjusting its output power level so as to change the geographic area over which its signal can be detected by a subscriber, such as the subscriber U1 shown in FIG. 3.

For various reasons, radio frequency signals may from time to time experience increased fading which fading effects the distance over which communications can be maintained. At times during which the signal between the stations (10 and 12) fades, the area in which a user such as the user U1, is proscribed from using the channel $B_1$, which channel is used by the stations (10 and 12), will increase. (When the signal on the channel $B_1$ between the stations is fading, the output power from the transmitter of the subscribe U1 is more capable of interfering with the use of channel $B_1$ by the stations ( 10 and 12).

During times when the signal strength of the frequency on channel $B_1$ decreases, the area over which reuse of channel $B_1$ by a second subscriber associated with a second system (U1) should decrease. In such cases, the output power of the beacon transmitter (32) when increased, will change the distance over which its signal can be detected from the distance D1 as shown to the distance D2.

Modulating the output power of the beacon transmitter (32) might be controlled based upon the bit error rate or other error rate detected by the station (10 or 12) in response to fades caused by any source or reason. It should be noted that the area enclosed by the broken lines designated by references D1 and D2 are circular corresponding to the fact that the antenna that might be used with the beacon transmitter (32) is an omnidirectional antenna where it is desirable to have a beacon signal that can be detected from any direction. Alternatively, this radiated beacon signal may be directional in order to further limit any interference caused to the stations (10 and 12) on channel $B_1$.

Still referring to FIG. 3, the fifth and sixth point-to-point stations (17 and 19) communicate with each other using a third channel $B_4$ as shown. The geographic area in which reuse of channel $B_4$ is not permitted is identified by the broken line identified by reference numeral (21).

The intersection of the geographic area identified by reference numeral (20) and the geographic area identified by reference numeral (14) in FIG. 3 comprises an area in which neither frequency $B_1$ nor frequency $B_3$ would be reusable by subscribers associated with the second radio system.

In FIG. 3, a separate beacon transmitter (13) might broadcast the geographic coordinates of geographic areas in which certain communications channels are not to be reused by subscribers of a second radio system. If a beacon transmitter (13) coupled to a point-to-point station (17 for example) broadcasts appropriate information, it can by broadcasting such information proscribe reuse of frequencies within an area, such as the area enclosed by the broken lines and identified by reference numeral (23).

It should be pointed out that areas in which frequencies can be re-used can vary with both the horizontal distance away from a beacon transmitter and vertical elevation as well. Upper floors in a building for example might comprise areas in which one or more re-useable frequencies that are used in a nearby area for point-to-point communications are available under certain conditions to re-users in the building. In such an application, to avoid interfering use caused by virtue of the elevation available in a building, re-users at high elevations might be required to use very low power to offset the advantage their emitted signals would likely have by virtue of their height.

In any embodiment of this invention, information from the beacon transmitter might be broadcast on a frequency or carrier that is used by the point-to-point microwave stations for example. In using the carrier information that an existing user is occupying, the communications equipment used by the second system's communications equipment may of course be more complex to be able to extract the relative information.

In most instances, a beacon transmitter located approximate to broadcasting towers that are used by existing services will broadcast beacon information on a separate channel such as the channel C shown in FIG. 2.

While the embodiment depicted in FIG. 3 contemplates locating or co-locating the beacon transmitters proximate to the location of the transmitters and antennas of the pre-existing users, an alternate embodiment would include using a single beacon transmitter (13) such as the one shown in FIG. 3 which transmitter would have sufficient output power to permit any subscriber, anywhere within the geographic coverage area (A) of the beacon transmitter (13) to receive and detect information broadcast from this centralized beacon transmitter (13). To be able to permit reuse of channels within various areas, the centralized beacon transmitter (13) would of course have to include the capability of broadcasting geographic information that would be sufficiently detailed to permit users within these areas to know which frequencies to use and which to not use.

What is claimed is:

1. In a first communications system comprising a plurality of first type communications stations, said first type communications stations are substantially fixed location, point-to-point radio frequency stations, each said first type communications station using at least one radio frequency channel among a plurality of re-usable radio frequency channels to communicate with other first type communications stations, use of a radio frequency channel by, a first type communications station precluding re-use of said channel within a first geographic region proximate to said first type communications station, unused radio frequency channels within said first geographic region being available for re-use within said first geographic region by second type communications stations, said second type communications stations being associated with a second communications system that is comprised of a plurality of said second type communications stations, an apparatus for limiting radio frequency interference to said first type communications stations in said first communications system caused by re-use of radio frequency channels by said second type communications stations of said second communications system within said first geographic region, said apparatus comprising:

at least one beacon radio transmitter located geographically proximate to the location of at least one of said first type communications stations, said beacon transmitter broadcasting identifying information on a predetermined radio frequency channel to said second type communications stations concerning both an approximate boundary of said first geographical region, and which, if any radio frequency channels are not available for re-use by said second type communications stations within said first geographical region.

2. The apparatus of claim 1 wherein said beacon transmitter broadcasts information to enable said second type communications station to substantially identify said approximate boundaries of geographic areas containing said first type communications stations wherein the at least one radio frequency channel used by the first type communications system is not available for use by said second type communications stations of said second communications system.

3. The apparatus of claim 1, wherein the second type communications stations have the ability to determine their geographic location.

4. The apparatus of claim 1, wherein the second type communications stations monitor the predetermined radio frequency channel for information broadcast by the at least one beacon radio transmitter and if the second type communications stations do not receive any information they may use any of the plurality of re-usable radio frequency channels.

5. The apparatus of claim 1, wherein the at least one beacon radio transmitter can adjust its output power.

* * * * *